(12) United States Patent
Nehse

(10) Patent No.: US 7,857,725 B2
(45) Date of Patent: Dec. 28, 2010

(54) DIFFERENTIAL GEAR FOR VEHICLES, IN PARTICULAR FOR FOUR WHEEL DRIVE VEHICLES

(75) Inventor: Wolfgang Nehse, Reichling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/629,340

(22) Filed: Dec. 2, 2009

(65) Prior Publication Data

US 2010/0075796 A1    Mar. 25, 2010

Related U.S. Application Data

(63) Continuation of application No. PCT/EP2008/005757, filed on Jul. 15, 2008.

(30) Foreign Application Priority Data

Aug. 10, 2007   (DE) .................. 10 2007 037 676

(51) Int. Cl.
   *F16H 48/10* (2006.01)
(52) U.S. Cl. ..................................... 475/225
(58) Field of Classification Search ................ 475/220, 475/221, 224, 225, 231
   See application file for complete search history.

(56) References Cited

U.S. PATENT DOCUMENTS

| 5,910,064 | A | 6/1999 | Kuroki |
| 7,004,876 | B2 * | 2/2006 | Puiu ............................ 475/205 |
| 2004/0018909 | A1 * | 1/2004 | Hwa et al. ................... 475/221 |
| 2005/0032599 | A1 | 2/2005 | Gassmann |
| 2007/0021262 | A1 | 1/2007 | Honda et al. |
| 2007/0021264 | A1 | 1/2007 | Honda et al. |

FOREIGN PATENT DOCUMENTS

| DE | 198 01 494 A1 | 9/1998 |
| DE | 103 29 770 A1 | 2/2005 |
| DE | 10 2004 025 005 A1 | 9/2005 |
| DE | 10 2006 030 214 A1 | 1/2007 |
| DE | 10 2006 030 216 A1 | 2/2007 |
| WO | WO 2007/079956 A1 | 7/2007 |

OTHER PUBLICATIONS

International Search Report dated Jul. 6, 2009 with English translation (five (5) pages).
German Search Report dated Jun. 26, 2008 with English translation (nine (9) pages).

* cited by examiner

*Primary Examiner*—Roger L Pang
*Assistant Examiner*—Edwin A. Young
(74) *Attorney, Agent, or Firm*—Crowell & Moring LLP

(57) ABSTRACT

A differential gear includes a drive, in particular a bevel drive pinion, a left output shaft and a right output shaft, a rotatably mounted basket, which is driven by the drive, and which is coupled with the left output shaft by a left superposition gear and with the right output shaft by a right superposition gear, a double planetary gear set, which exhibits an internal geared wheel, which is mounted on the basket, as well as radially outer planet gears, which mesh with the internal geared wheel, radially inner planet gears, which mesh with the radially outer planet gears and with a gearwheel, which is connected to a first of the two output shafts, and a planet carrier, on which the radially inner and the radially outer planet gears are mounted. The planet carrier can be coupled with the second of the two output shafts by way of a clutch.

11 Claims, 3 Drawing Sheets

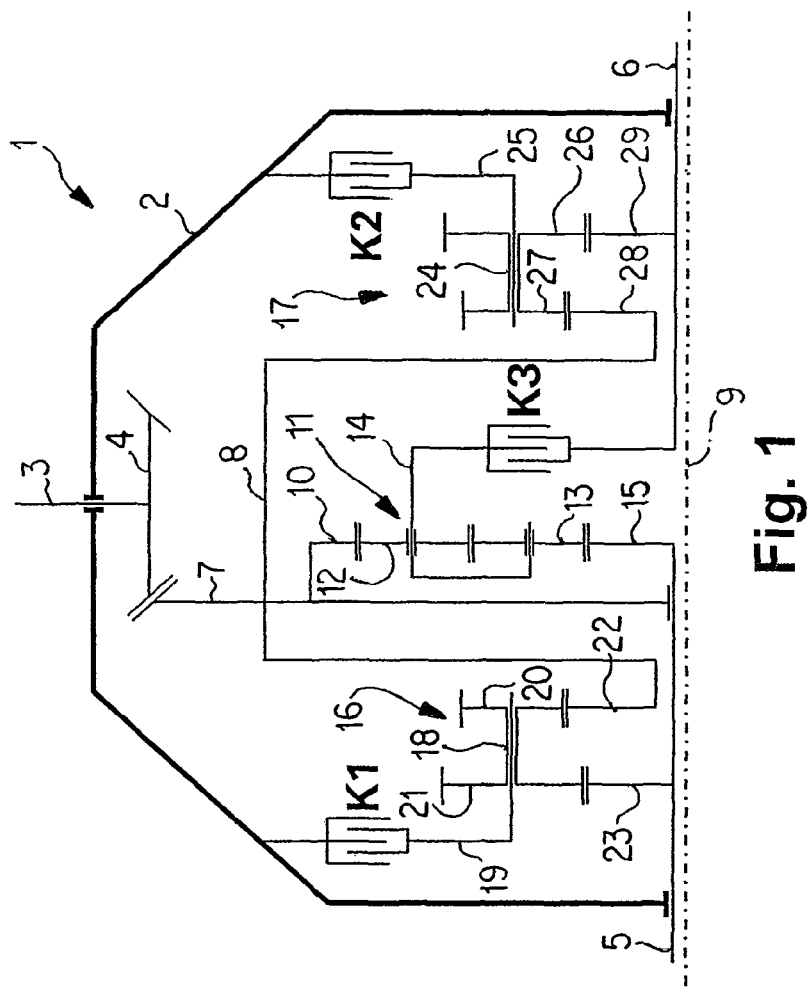
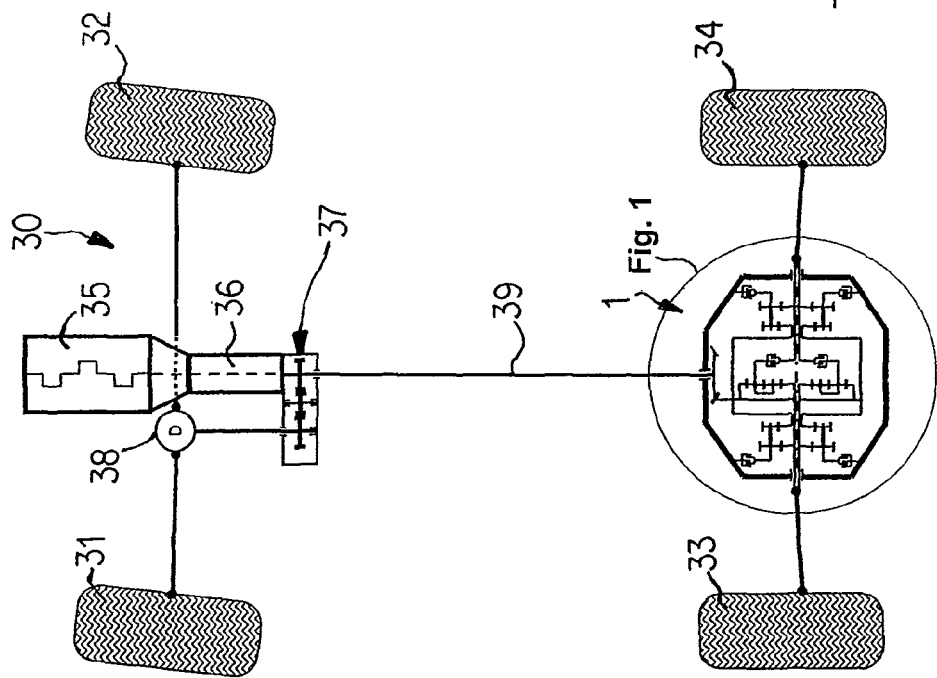
Fig. 1
Fig. 2

DIFFERENTIAL GEAR FOR VEHICLES, IN PARTICULAR FOR FOUR WHEEL DRIVE VEHICLES

CROSS-REFERENCE TO RELATED APPLICATIONS

This application is a continuation of PCT International Application No. PCT/EP2008/005757, filed Jul. 15, 2008, which claims priority under 35 U.S.C. §119 to German Patent Application No. DE 10 2007 037 676.8, filed Aug. 10, 2007, the entire disclosures of which are herein expressly incorporated by reference.

BACKGROUND AND SUMMARY OF THE INVENTION

The present invention relates to a differential gear for vehicles, in particular for four wheel drive vehicles.

Four wheel drive vehicles include a transfer case, which splits the torque, delivered by the engine, between the front axle and the rear axle. In addition, each of the two axles also requires an axle gear, that is a differential gear, which makes it possible to balance the rotational speed between the wheels on the inside and the outside of the curve when cornering. Frequently, modern four wheel drive vehicles must satisfy the requirement that the torque can be split in a totally variable manner between the front axle and the rear axle. Whereas the axle gear of conventional vehicles acts as the "torque balance", that is, the same torque is always transferred to the two output shafts, the trend is to demand, especially in the case of four wheel drive vehicles, that the torque be split in a tailored manner, that is, adapted to the specific driving situation, between the two wheels of an axle.

The object of the invention is to provide a differential gear, which is intended for vehicles and which makes possible an independent splitting of the introduced torque between the two output gears, that is suitable especially for four wheel drive vehicles and makes possible an independent splitting of the current torque between the front and rear axle, and can be shifted into an "overdrive mode".

This object is achieved by a differential gear, including a drive, in particular a bevel drive pinion, and a left output shaft and a right output shaft. A rotatably mounted basket is driven by the drive, and is coupled with the left output shaft by way of a left superposition gear and with the right output shaft by way of a right superposition gear. A double planetary gear set exhibits an internal geared wheel, which is mounted on the basket, as well as radially outer planet gears, which mesh with the internal geared wheel. Radially inner planet gears mesh with the radially outer planet gears and with a gearwheel, which is connected to a first of the two output shafts. A planet carrier is provided on which the radially inner and the radially outer planet gears are mounted. The planet carrier can be coupled with the second of the two output shafts by way of a clutch. Advantageous embodiments are further developments of the invention are described herein.

The starting point of the invention is a differential gear with a drive, which can be formed, for example, by a bevel drive pinion. The drive forms the "input" of the differential gear. Of course, the differential gear has two outputs, that is, a left output shaft and a right output shaft as well as a rotatably mounted "basket", which is driven by the "drive". The basket is coupled with the left output shaft by way of a left "superposition gear" and with the right output shaft by way of a right superposition gear. Furthermore, in contrast to conventional differential gears, the differential gear exhibits a "double planetary gear set". The double planetary gear set in turn exhibits an internal geared wheel, which is mounted on the basket, as well as radially outer planet gears, which mesh with the internal geared wheel, and radially inner planet gears, which mesh with the radially outer planet gears and with a gearwheel, which is connected to a "first" of the two output shafts, and a planet carrier, on which the radially inner and the radially outer planet gears are mounted. The planet carrier is mounted in a rotatable manner with respect to an axis that is formed by the two output shafts. The planet carrier can be coupled with the "second" of the two output shafts by use of a clutch.

Preferably, each of the two superposition gears is assigned a superposition gear clutch, which in each case is provided for the purpose of opening or closing the assigned torque path between the basket and the assigned output shaft. The results of having these clutches, in total three, which are integrated into the differential gear, are various operating states, which are explained below in detail in connection with the drawings.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic drawing of a differential gear, according to an exemplary embodiment of the invention;

FIG. 2 depicts a four wheel drive vehicle with a rear axle gear, according to FIG. 1.

DETAILED DESCRIPTION OF THE DRAWINGS

Figure 3:
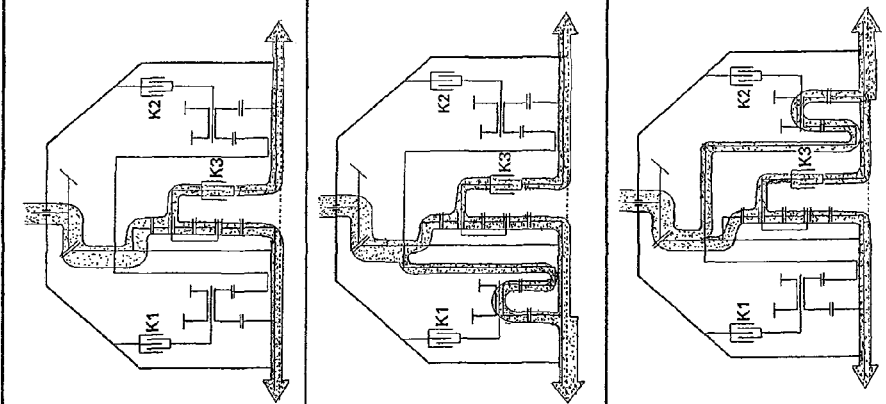
FIGS. 3 and 4 are schematic drawings of various operating states of the differential gear, shown in FIG. 1.

FIG. 1 depicts a differential gear 1, which is housed in a housing 2, and which has a gear input 3 with a bevel pinion 4 as well as a left output shaft 5 and a right output shaft 6. The bevel pinion 4 meshes with a ring gear 7, which is mounted on a "basket" 8. The basket 8 is mounted in a rotatable manner about an axis 9 in the housing 2.

The basket 8 has an internal geared wheel 10, which is a component of a double planetary gear set 11. Apart from the internal geared wheel 10, the double planetary gear set 11 exhibits radially outer planet gears 12 as well as radially inner planet gears 13. The radially outer planet gears 12 mesh with the internal geared wheel 10 and with the radially inner planet gears 13. The radially outer planet gears 12 and the radially inner planet gears 13 are mounted in a rotatable manner on a joint leg or rather a planet carrier 14. The planet carrier 14 in turn is mounted rotatably with reference to the axis 9 in the housing 2. Furthermore, the radially inner planet gears 13 are in engagement with a gearwheel 15, which is connected in a rotationally rigid manner to the left output shaft 5.

Moreover, the differential gear 1 exhibits a left superposition gear 16 and a right superposition gear 17. The left superposition gear 16 has a planet shaft 18, which is mounted in a rotatable manner on a leg 19, which in turn is mounted in a rotatable manner with respect to the axis 9 in the gear housing 2 and can be fixed in position with respect to the housing 2 by way of a first clutch K1. On the planet shaft 18 there are mounted in a rotatable manner two intermediate gears 20, 21, which are coupled together in rotation. The intermediate gear 20 meshes with a gearwheel 22, which is connected to the basket 8 or rather is mounted on the basket 8. The intermediate gear 21 meshes with a gearwheel 23, which is connected in a rotationally rigid manner to the output shaft 5.

The superposition gear 17 is constructed "symmetrically" and exhibits a planet shaft 24, which is mounted on a leg 25, which in turn can be fixed in position with respect to the housing 2 by way of a second clutch K2. On the planet shaft 24 there are mounted two intermediate gears 26, 27, which are coupled together in rotation. The intermediate gear 27 meshes with a gearwheel 28, which is connected to the basket 8 or rather is mounted on the basket 8. In contrast, the intermediate gear 26 meshes with a gearwheel 29, which is connected in a rotationally rigid manner to the right output shaft 6.

The function of the differential gear 1 is explained in greater detail below in connection with FIGS. 3 and 4.

FIG. 2 depicts a four wheel drive vehicle 30 with front wheels 31, 32 and rear wheels 33, 34. The four wheel drive vehicle 30 is driven by an internal combustion engine 35 with a gearbox 36, which is flangedly mounted to the internal combustion engine, and which can be, for example, an automatic transmission, a manually operated transmission, an automated manually operated transmission, or the like.

Mounted on the gearbox 36 is a transfer case 37, which couples the gear output of the gearbox 36 permanently with a front axle differential 38. The term "permanently" means in this context that the transfer case 37 is coupled with the front axle differential 38 by means of, for example, a chain drive or a gearwheel stage and that there is no switchable clutch in the torque path between the transfer case 36 and the front wheels 31, 32.

The transfer case 37 is coupled with the gear input 3 (depicted in FIG. 1) of the differential gear 1 by way of an articulated shaft 39.

Figure 4:
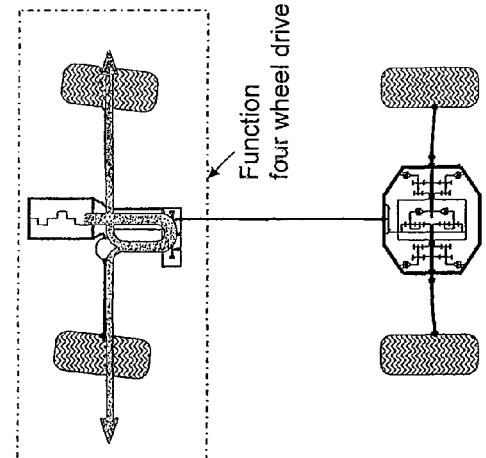

The operating principle of the differential gear 1, depicted in FIG. 1, is explained in detail with reference to the table, which is shown in FIGS. 3 and 4.

In a first operating state, the two clutches K1 and K2 are opened, and the clutch K3 is closed. As apparent from the first line of the table in FIG. 3, a torque, which is introduced into the differential gear 1 by way of the gear input 3, is split uniformly between the two output shafts 5, 6. Therefore, in this operating state, the differential gear 1 acts as the torque balance in a manner analogous to a conventional differential gear. Proceeding from a state, in which all three clutches K1, K2, K3 are opened, it is possible for a vehicle having just a rear wheel drive to start up. In the case of a vehicle with four wheel drive, the gradual closing of the clutch K3 will cause the torque to "branch off" from the front axle to the rear axle.

The second line of the table in FIG. 3 shows a state, in which an "asymmetrical" torque splitting is achieved by partially closing the clutch K1. In this operating state, the clutch K1 is partially closed, the clutch K2 is opened, and the clutch K3 is closed. From a torque, which amounts, for example, to 1,000 Nm, and which is introduced by way of the input shaft 3, a component torque of, for example, 200 Nm is branched off to the left superposition gear 16. The remaining torque in the amount of 800 Nm is split into equal parts by the double planetary gear set 11 between the left and the right output shaft 5 and/or 6. Hence, in this example the output torque of the right output shaft 6 is 400 Nm, whereas the output torque of the left output shaft 5 is 600 Nm, since the 200 Nm torque, which was branched off by way of the superposition gear 16, is also fed to the left output shaft 5.

Thus, by partially closing the clutch K1 it is possible to "move" in a targeted manner the torque from the right output shaft to the left output shaft, as a result of which the vehicle is stabilized in critical driving situations and/or the traction is improved when travelling on a road exhibiting μ-split conditions.

The third line of the table in FIG. 3 shows the reverse situation, in which the clutch K1 is opened, the clutch K2 is partially closed, and the clutch K3 is also closed. By partially closing the clutch K2, the torque can be "moved" from the left output shaft to the right output shaft 6. The operating principle is the same as in the second line of the table in FIG. 3.

The first line of the table in FIG. 4 describes a state, in which the three clutches K1, K2, K3 are totally opened. The result is that no torque can be transferred over the rear wheels 33, 34.

In the case of a vehicle with front wheel drive, the opening of all three clutches K1, K2, K3 transfers the entire torque, delivered by the gearbox 36, to the two front wheels by way of the front axle differential 38. The two rear wheels 33, 34 therefore, run along in an "unpowered" mode. A vehicle with rear wheel drive in this operating state is not driven.

The second line of the table in FIG. 4 shows a so-called "overdrive" state. In the overdrive state, the two clutches K1, K2 are closed, and the clutch K3 is opened. Thus, the two superposition gears 16, 17 produce an additional "overdrive" ratio, that is, a speed increasing ratio.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A differential gear, comprising:
    a drive;
    a left output shaft and a right output shaft;
    a rotatably mounted basket driven by the drive, the rotatably mounted basket being coupled with the left output shaft by way of a left superposition gear and with the right output shaft by way of a right superposition gear;
    a double planetary gear set comprising:
        an internal geared wheel mounted on the basket;
        radially outer planet gears that mesh with the internal geared wheel;
        radially inner planet gears that mesh with the radially outer planet gears and with a gearwheel that is connected to a first of the left and right output shafts;
        a planet carrier on which the radially inner and the radially outer planet gears are mounted; and
        a clutch operatively configured for coupling the planet carrier with a second of the left and right output shafts.

2. The differential gear according to claim 1, wherein the drive is a bevel drive pinion.

3. The differential gear according to claim 1, further comprising:
    superposition gear clutches, one superposition gear clutch being assigned to a respective one of the left and right superposition gears, the superposition gear clutches being operatively configured to close and release an assigned torque path between the basket and the output shaft respectively assigned to the superposition gear.

4. The differential gear according to claim 3, wherein each of the left superposition gear and the right superposition gear includes an intermediate shaft having first and second intermediate gears;
    wherein the first and second intermediate gears are coupled together in rotation and are mounted in a rotatable manner on the intermediate shaft;
    the first intermediate gear being coupled in rotation with the basket by way of a basket toothing; and the second intermediate gear being coupled with one of the left and right output shafts by way of a drive shaft toothing.

5. The differential gear according to claim 4, wherein the intermediate shaft of each superposition gear is mounted in a rotatable manner on a leg, said leg being mountable in a rotatable manner about an axis formed by the left and right output shafts; and wherein by closing the respective superposition gear clutch, the respective leg is fixable in position.

6. The differential gear according to claim 1, wherein each of the left superposition gear and the right superposition gear includes an intermediate shaft having first and second intermediate gears;

wherein the first and second intermediate gears are coupled together in rotation and are mounted in a rotatable manner on the intermediate shaft;

the first intermediate gear being coupled in rotation with the basket by way of a basket toothing; and the second intermediate gear being coupled with one of the left and right output shafts by way of a drive shaft toothing.

7. The differential gear according to claim 6, wherein the intermediate shaft of each superposition gear is mounted in a rotatable manner on a leg, said leg being mountable in a rotatable manner about an axis formed by the left and right output shafts; and wherein by closing an assigned superposition gear clutch, the respective leg is fixable in position.

8. A vehicle, comprising:
a differential gear comprising:
a drive;
a left output shaft and a right output shaft;
a rotatably mounted basket driven by the drive, the rotatably mounted basket being coupled with the left output shaft by way of a left superposition gear and with the right output shaft by way of a right superposition gear;
a double planetary gear set comprising:
an internal geared wheel mounted on the basket;
radially outer planet gears that mesh with the internal geared wheel;
radially inner planet gears that mesh with the radially outer planet gears and with a gearwheel that is connected to a first of the left and right output shafts;
a planet carrier on which the radially inner and the radially outer planet gears are mounted; and
a clutch operatively configured for coupling the planet carrier with the second of the left and right output shafts.

9. The vehicle according to claim 8, further comprising:
superposition gear clutches, one superposition gear clutch being assigned to a respective one of the left and right superposition gears, the superposition gear clutches being operatively configured to close and release an assigned torque path between the basket and the output shaft respectively assigned to the superposition gear.

10. The vehicle according to claim 9, wherein each of the left superposition gear and the right superposition gear includes an intermediate shaft having first and second intermediate gears;

wherein the first and second intermediate gears are coupled together in rotation and are mounted in a rotatable manner on the intermediate shaft;

the first intermediate gear being coupled in rotation with the basket by way of a basket toothing; and the second intermediate gear being coupled with one of the left and right output shafts by way of a drive shaft toothing.

11. The vehicle according to claim 10, wherein the intermediate shaft of each superposition gear is mounted in a rotatable manner on a leg, said leg being mountable in a rotatable manner about an axis formed by the left and right output shafts; and wherein by closing the respective superposition gear clutch, the respective leg is fixable in position.

* * * * *